United States Patent
Oshins

(10) Patent No.: US 9,535,767 B2
(45) Date of Patent: *Jan. 3, 2017

(54) INSTANTIATING A VIRTUAL MACHINE WITH A VIRTUAL NON-UNIFORM MEMORY ARCHITECTURE

(75) Inventor: Jacob Oshins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 921 days.

This patent is subject to a terminal disclaimer.

(21) Appl. No.: 12/412,258

(22) Filed: Mar. 26, 2009

(65) Prior Publication Data

US 2010/0251234 A1 Sep. 30, 2010

(51) Int. Cl.
| | |
|---|---|
| G06F 9/50 | (2006.01) |
| G06F 9/48 | (2006.01) |
| G06F 9/455 | (2006.01) |
| G06F 12/02 | (2006.01) |

(52) U.S. Cl.
CPC ......... *G06F 9/5077* (2013.01); *G06F 9/45504* (2013.01); *G06F 9/45558* (2013.01); *G06F 9/4856* (2013.01); *G06F 12/0284* (2013.01); *G06F 2009/45562* (2013.01); *G06F 2212/152* (2013.01); *G06F 2212/2542* (2013.01)

(58) Field of Classification Search
CPC G06F 9/45504; G06F 9/45558; G06F 9/4856; G06F 9/5077; G06F 12/0284; G06F 2009/45562; G06F 2212/152; G06F 2212/2542

See application file for complete search history.

(56) References Cited

U.S. PATENT DOCUMENTS

| | | | |
|---|---|---|---|
| 5,283,730 A * | 2/1994 | Ito | 700/90 |
| 6,075,938 A | 6/2000 | Bugnion | |
| 6,336,170 B1 * | 1/2002 | Dean et al. | 711/147 |
| 7,231,504 B2 | 6/2007 | Kashyap et al. | |
| 7,290,259 B2 | 10/2007 | Tanaka et al. | |
| 7,334,076 B2 | 2/2008 | Hendel et al. | |
| 7,434,002 B1 | 10/2008 | Zedlewski | |

(Continued)

FOREIGN PATENT DOCUMENTS

| | | |
|---|---|---|
| CN | 101158927 | 4/2008 |
| CN | 101271401 | 9/2008 |

(Continued)

OTHER PUBLICATIONS

Govil et al., "Cellular Disco: Resource Management Using Virtual Clusters on Shared-Memory Multiprocessors," Operating Systems Review, Dec. 1999, 34(5), p. 154-169, http://citeseerx.ist.psu.edu/viewdoc/download?doi=10.1.1.33.6713&rep=rep1&type=pdf.

(Continued)

*Primary Examiner* — David J Huisman
(74) *Attorney, Agent, or Firm* — John Jardine; Dan Choi; Micky Minhas

(57) ABSTRACT

Techniques for effectuating a virtual NUMA architecture for virtual machines are disclosed herein. In an embodiment, a system determines the physical topology of a datacenter. When instantiating a virtual machine, the system determines a number of NUMA nodes for that VM based on the physical topology. The system then directs a second system to instantiate the virtual machine with the determined number of NUMA nodes.

20 Claims, 14 Drawing Sheets

(56) References Cited

U.S. PATENT DOCUMENTS

| | | | |
|---|---|---|---|
| 7,451,459 | B2 | 11/2008 | Glass et al. |
| 7,596,654 | B1 * | 9/2009 | Wong .............................. 711/6 |
| 7,945,913 | B2 | 5/2011 | Kashyap |
| 8,195,866 | B2 | 6/2012 | Ginzton |
| 2002/0144185 | A1 | 10/2002 | Farago et al. |
| 2002/0152371 | A1 | 10/2002 | Lee et al. |
| 2003/0009641 | A1 | 1/2003 | Arimilli et al. |
| 2003/0037092 | A1 | 2/2003 | McCarthy et al. |
| 2004/0015366 | A1 | 1/2004 | Wiseman et al. |
| 2004/0205304 | A1 | 10/2004 | McKenney et al. |
| 2005/0120160 | A1 * | 6/2005 | Plouffe et al. .................... 711/1 |
| 2005/0132362 | A1 | 6/2005 | Knauerhase et al. |
| 2005/0262505 | A1 | 11/2005 | Esfahany et al. |
| 2006/0136653 | A1 | 6/2006 | Traut et al. |
| 2006/0184938 | A1 | 8/2006 | Mangold |
| 2006/0206891 | A1 | 9/2006 | Armstrong et al. |
| 2007/0067604 | A1 | 3/2007 | Elnozahy et al. |
| 2007/0100845 | A1 | 5/2007 | Sattler et al. |
| 2007/0198243 | A1 | 8/2007 | Leis et al. |
| 2007/0250784 | A1 | 10/2007 | Riley et al. |
| 2008/0028179 | A1 | 1/2008 | Mannarswamy et al. |
| 2008/0071642 | A1 | 3/2008 | Leiba |
| 2008/0155168 | A1 | 6/2008 | Sheu et al. |
| 2009/0307686 | A1 | 12/2009 | Hepkin |
| 2009/0313445 | A1 * | 12/2009 | Pandey et al. ................ 711/162 |
| 2010/0223622 | A1 * | 9/2010 | Anand et al. ................ 718/105 |
| 2010/0250868 | A1 | 9/2010 | Oshins |

FOREIGN PATENT DOCUMENTS

| | | |
|---|---|---|
| JP | 2006-178933 A | 7/2006 |
| JP | 2007-257097 A | 10/2007 |
| RU | 2003123112 A | 2/2005 |
| RU | 47116 U1 | 8/2005 |
| RU | 2006103559 A | 8/2007 |

OTHER PUBLICATIONS

"Virtualization: State of the Art," Scope Alliance, http://www.scope-alliance.org/pr/SCOPE-Virtualization-StateofTheArt-Version-1.0.pdf, Apr. 3, 2008, p. 1-18.

Gummaraju et al., "Virtual Machines," EE392C Lecture # 10 Advanced Topics in Computer Architecture, http://www.stanford.edu/class/ee392c/notes/lec10/notes10.pdf, May 1, 2003, p. 1-5.

Whitaker et al., "Rethinking the Design of Virtual Machine Monitors," IEEE, University of Washington, http://www.cs.washington.edu/homes/gribble/papers/IEEE_vmm.pdf, May 2005, p. 57-62.

Chapman et al., "Implementing Transparent Shared Memory on Clusters Using Virtual Machines," Proceedings of the 2005 USENIX Annual Technical Conference, http://www.usenix.org/event/usenix05/tech/general/full_papers/short_papers/chapman/chapman_html/, 2005, p. 1-9.

Russinovich, M., "Inside Windows Server 2008 Kernel Changes," Microsoft Corporation, http://technet.microsoft.com/en-us/magazine/cc194386.aspx, 2008, p. 1-6.

Kaneda et al., "A Virtual Machine Monitor for Utilizing Non-Dedicated Clusters", ACM, SOSP'05, Brighton, United Kingdom, Oct. 23-26, 2005, 2 pages.

PCT Application No. PCT/US2010/028038 : International Search Report and Written Opinion of the International Searching Authority, Nov. 1, 2010, 7 pages.

Verghese et al., "OS Support for Improving Data Locality on CC-NUMA Compute Servers", Technical Report: CSL-TR-96-688, Feb. 1996, 35 pages.

Supplementary Search Report Issued in European Patent Application No. 10756649.9, Mailed Date: Aug. 22, 2014, 7 Pages.

* cited by examiner

INSTANTIATING A VIRTUAL MACHINE WITH A VIRTUAL NON-UNIFORM MEMORY ARCHITECTURE

CROSS REFERENCE TO RELATED APPLICATION

This application is related to U.S. application Ser. No. 12/412,272 filed on Mar. 26, 2009, entitled "Virtual Non-Uniform Memory Architecture for Virtual Machines," the content of which is herein incorporated by reference in its entirety.

BACKGROUND

Virtualization technology allows for sharing hardware resources between multiple partitions, each of which can host a guest operating system. Generally, virtual machine technology can be used to consolidate servers and increase their portability. As virtual machines become larger, and their workloads increase, the ability to easily consolidate and/or migrate them from one computer system to another becomes more difficult. Accordingly, techniques for increasing the ability to consolidate and/or migrate larger virtual machines are desirable.

SUMMARY

An example embodiment of the present disclosure describes a method. In this example, the method includes, but is not limited to receiving, by a management system, information indicative of the physical topology of computer systems in a datacenter; receiving a request to instantiate a virtual machine, the request indicating a characteristic for the virtual machine; determining, based on the physical topology of the computer systems and the characteristic for the virtual machine, a number of virtual NUMA nodes for the virtual machine; and sending a request to a computer system in the datacenter, the request directing the computer system to instantiate the virtual machine having the determined number of virtual NUMA nodes. In addition to the foregoing, other aspects are described in the claims, drawings, and text forming a part of the present disclosure.

An example embodiment of the present disclosure describes a method. In this example, the method includes, but is not limited to receiving a request to instantiate a virtual machine; generating the virtual machine, the virtual machine having a topology that includes a plurality of virtual NUMA nodes, each virtual NUMA node of the plurality including at least one virtual processor and a range of guest physical addresses, wherein the topology of the virtual machine is generated independently from the physical topology of the computer system; and instantiating the virtual machine, the virtual machine including the virtual NUMA nodes. In addition to the foregoing, other aspects are described in the claims, drawings, and text forming a part of the present disclosure.

An example embodiment of the present disclosure describes a method. In this example, the method includes, but is not limited to generating a plurality of virtual NUMA nodes for a virtual machine, each virtual NUMA node of the plurality including at least one virtual processor and at least one memory block of guest physical addresses, the plurality of virtual NUMA nodes being generating independently from a physical topology of any computer system; and instantiating the virtual machine on a computer system, the virtual machine including the plurality of virtual NUMA nodes. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
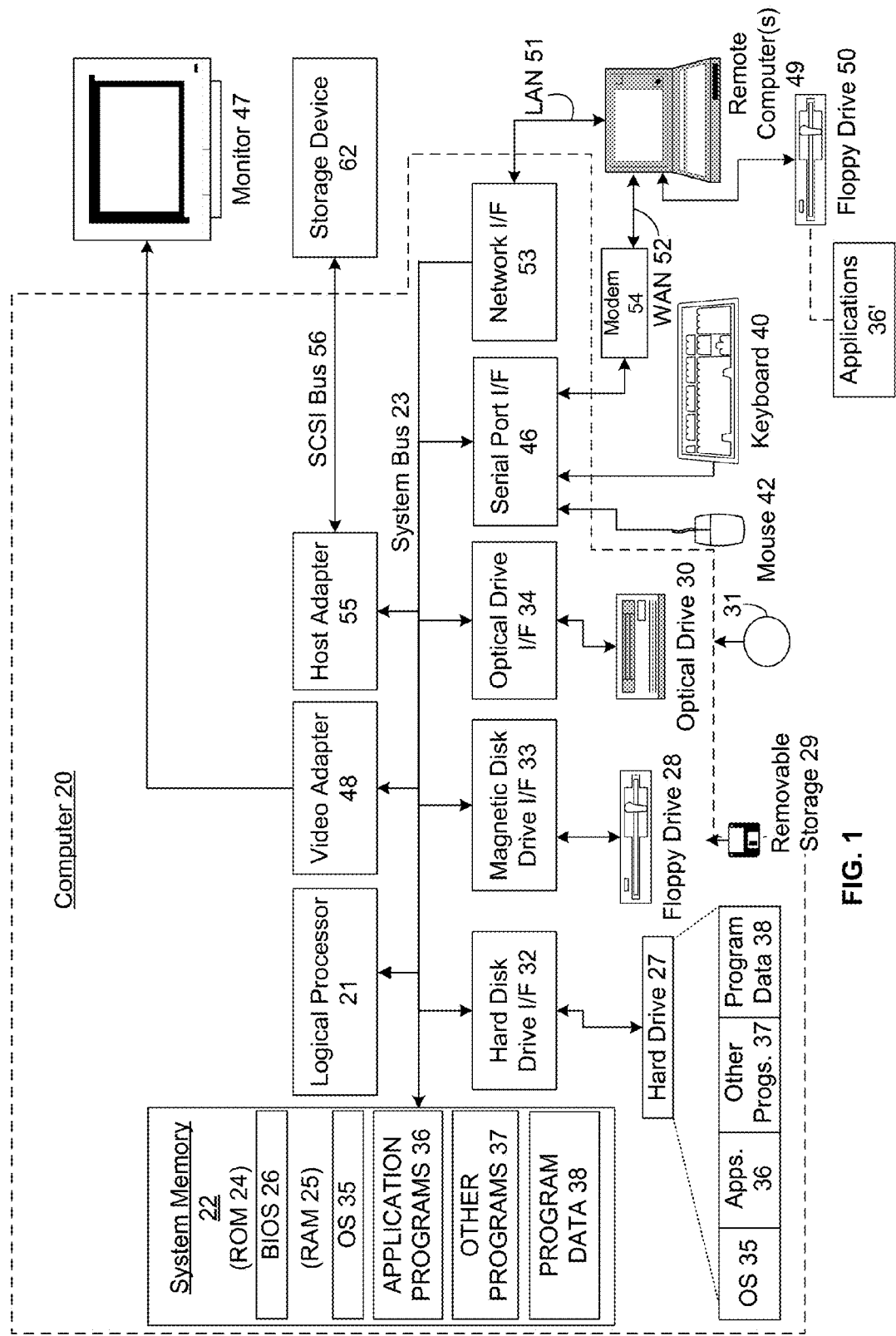
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that the computer system of FIG. 1 can in some embodiments effectuate computer systems 200, 300, 600, and 700. In these example embodiments, the computer systems can include some or all of the components described in FIG. 1 and circuitry configured to instantiate aspects of the present disclosure.

The term circuitry used through the disclosure can include hardware components such as hardware interrupt controllers, hard drives, network adaptors, graphics processors, hardware based video/audio codecs, and the firmware/software used to operate such hardware. In the same or other embodiments the term circuitry can include microprocessors configured to perform function(s) by firmware or by switches set in a certain way. In the same or other example embodiments the term circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is one of design choice and left to an implementer.

Referring now to FIG. 1, an exemplary general purpose computing system is depicted. The general purpose computing system can include a conventional computer 20 or the like, including a logical processor 21, a system memory 22, and a system bus 23 that couples various system components including the system memory to the logical processor 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable storage media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable storage media which can store data that is accessible by a computer, such as magnetic cassettes, flash memory cards, digital video disks, Bernoulli cartridges, random access memories (RAMs), read only memories (ROMs) and the like may also be used in the exemplary operating environment. Generally, in certain embodiments, such computer readable storage media can be used to store processor executable instructions embodying aspects of the present disclosure.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the logical processor 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
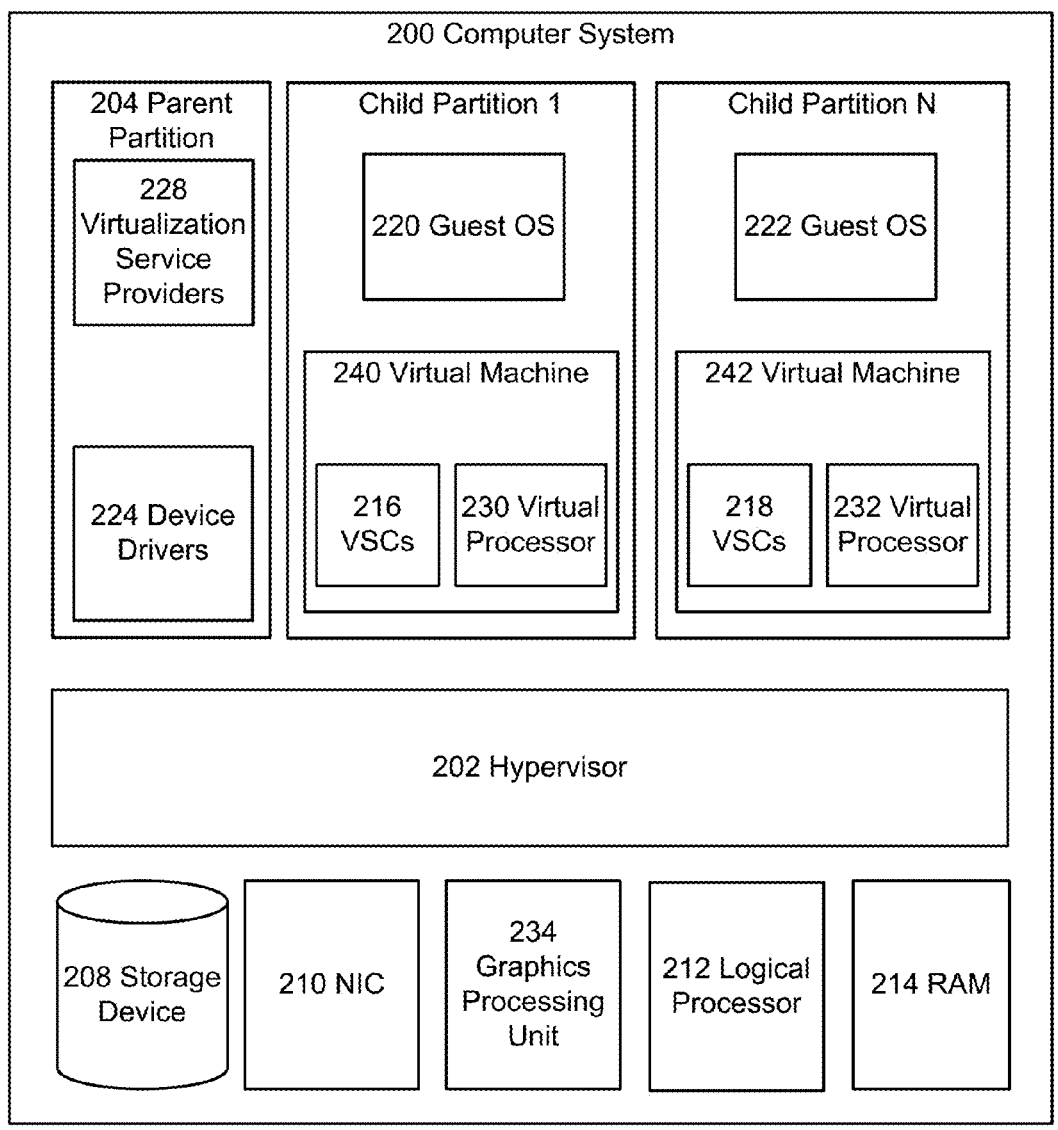
FIG. 2 depicts an operational environment for practicing aspects of the present disclosure.
Figure 3:
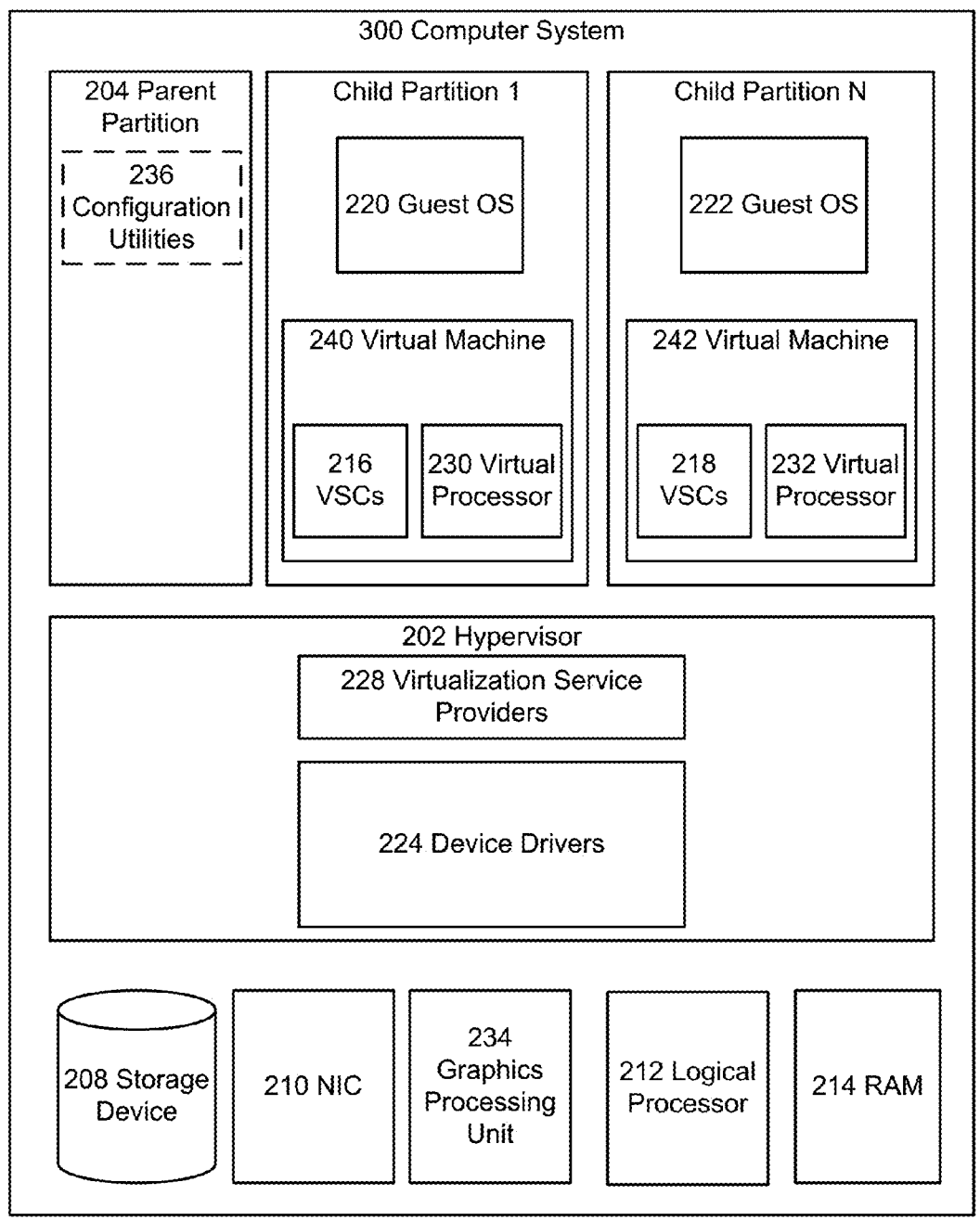
FIG. 3 depicts an operational environment for practicing aspects of the present disclosure.

Referring now to FIGS. 2 and 3, they depict high level block diagrams of computer systems. As shown by the figure, computer system 200 can include physical hardware devices such as a storage device 208, e.g., a hard drive, a network interface controller (NIC) 210, a graphics card 234, at least one logical processor 212, and random access memory (RAM) 214. Computer system 200 can also include similar components as computer 20 of FIG. 1. While one logical processor is illustrated, in other embodiments computer system 200 may have multiple logical processors, e.g., multiple execution cores per processor and/or multiple processors that could each have multiple execution cores. Continuing with the description of FIG. 2, depicted is a hypervisor 202 that may also be referred to in the art as a virtual machine monitor. The hypervisor 202 in the depicted embodiment includes executable instructions for controlling and arbitrating access to the hardware of computer system 200. Broadly, the hypervisor 202 can generate execution environments called partitions such as child partition 1 through child partition N (where N is an integer greater than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

In the depicted example the computer system 200 includes a parent partition 204 that can be also thought of as domain 0 in the open source community. Parent partition 204 can be configured to provide resources to guest operating systems executing in the child partitions 1-N by using virtualization service providers 228 (VSPs) that are also known as back-end drivers in the open source community. In this example architecture the parent partition 204 can gate access to the underlying hardware. Broadly, the VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figure, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Referring now to FIG. 3, it illustrates an alternative architecture that can be used. FIG. 3 depicts similar components to those of FIG. 2, however in this example embodiment the hypervisor 202 can include the virtualization service providers 228 and device drivers 224, and parent partition 204 may contain configuration utilities 236. In this architecture hypervisor 202 can perform the same or similar functions as the hypervisor 202 of FIG. 2. The hypervisor 202 of FIG. 3 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 4:
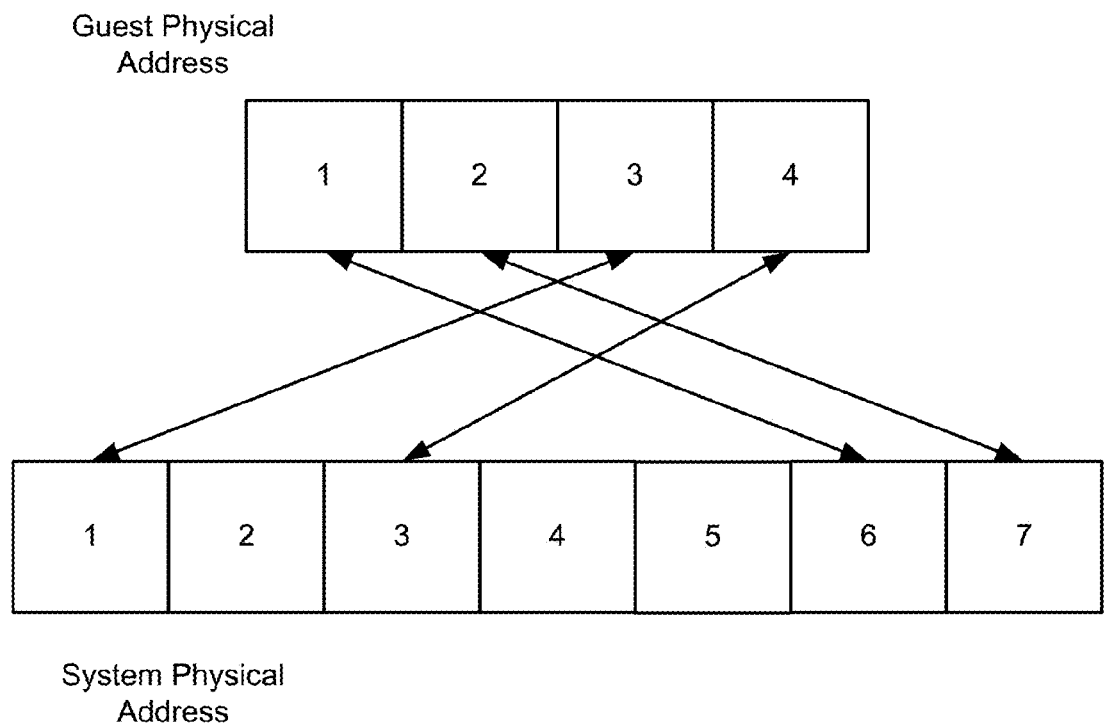
FIG. 4 depicts how memory can be arranged in embodiments.

Referring now to FIG. 4, it illustrates how memory can be arranged in embodiments that include virtual machines. For example, a computer system such as computer system 200 can have RAM 214 having memory addresses. Instead of reporting the system physical memory addresses to virtual machines, hypervisor 202 can present different addresses for the system physical addresses, e.g., guest physical addresses (GPAs), to memory managers of guest operating systems. The guest operating systems can then manipulate the guest physical addresses and hypervisor 202 maintains the relationship by the GPAs and the SPAs. As shown by the figure, in an embodiment the GPAs and SPAs can be arranged into memory blocks. Broadly, a memory block can include one or more pages of memory. The relationship between the GPAs and the SPAs can be maintained by shadow page table such those described in commonly assigned U.S. patent application Ser. No. 11/128,665 entitled "Enhanced Shadow Page Table Algorithms," the content of which is herein incorporated by reference by its entirety. In operation, when a guest operating system stores data in GPA of block 1, the data may actually be stored in a different SPA such as block 6 on the system.

Figure 5:
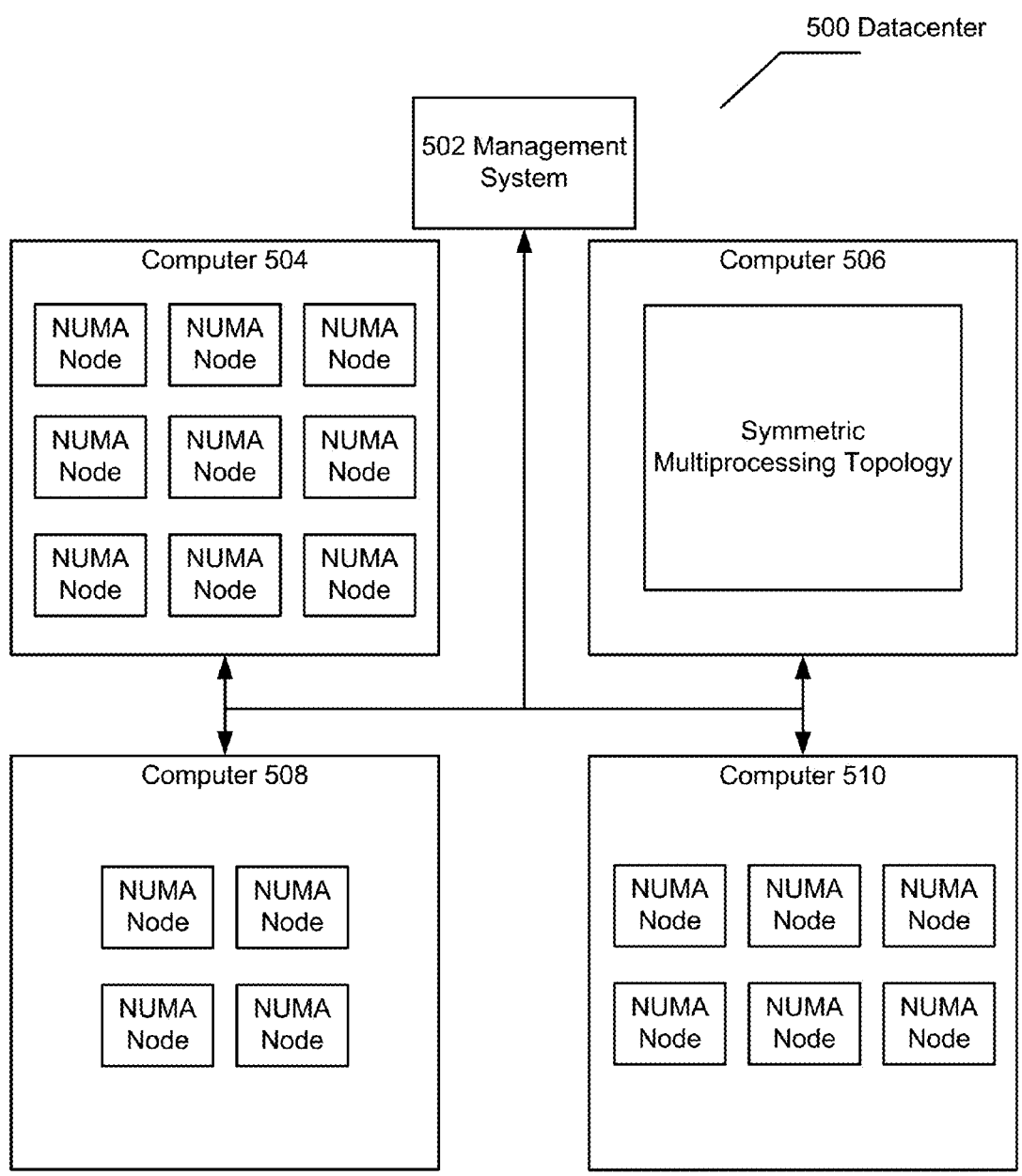
FIG. 5 depicts an example operational environment practicing aspects of the present disclosure.

Briefly FIG. 5 depicts an operations environment for practicing aspects of the present disclosure. For example a number of computer system 504-510 can be coupled together in a datacenter 500 (While four computer systems are depicted, one of skill in the art can appreciate that the datacenter can include more or less computer systems)

The depicted computer systems can have different topologies and moreover, they can have different characteristics, e.g., different amounts of RAM, different RAM speeds, different amount of logical processors, and/or logical processors with different speeds.

The management system 502 can have components similar to computer 20 of FIG. 1, and/or computer systems 200, 300, 600 or 700. That is, in an embodiment the management system 502 may be a computer system that includes subject matter described below with respect to FIG. 6 or FIG. 7.

Figure 6:
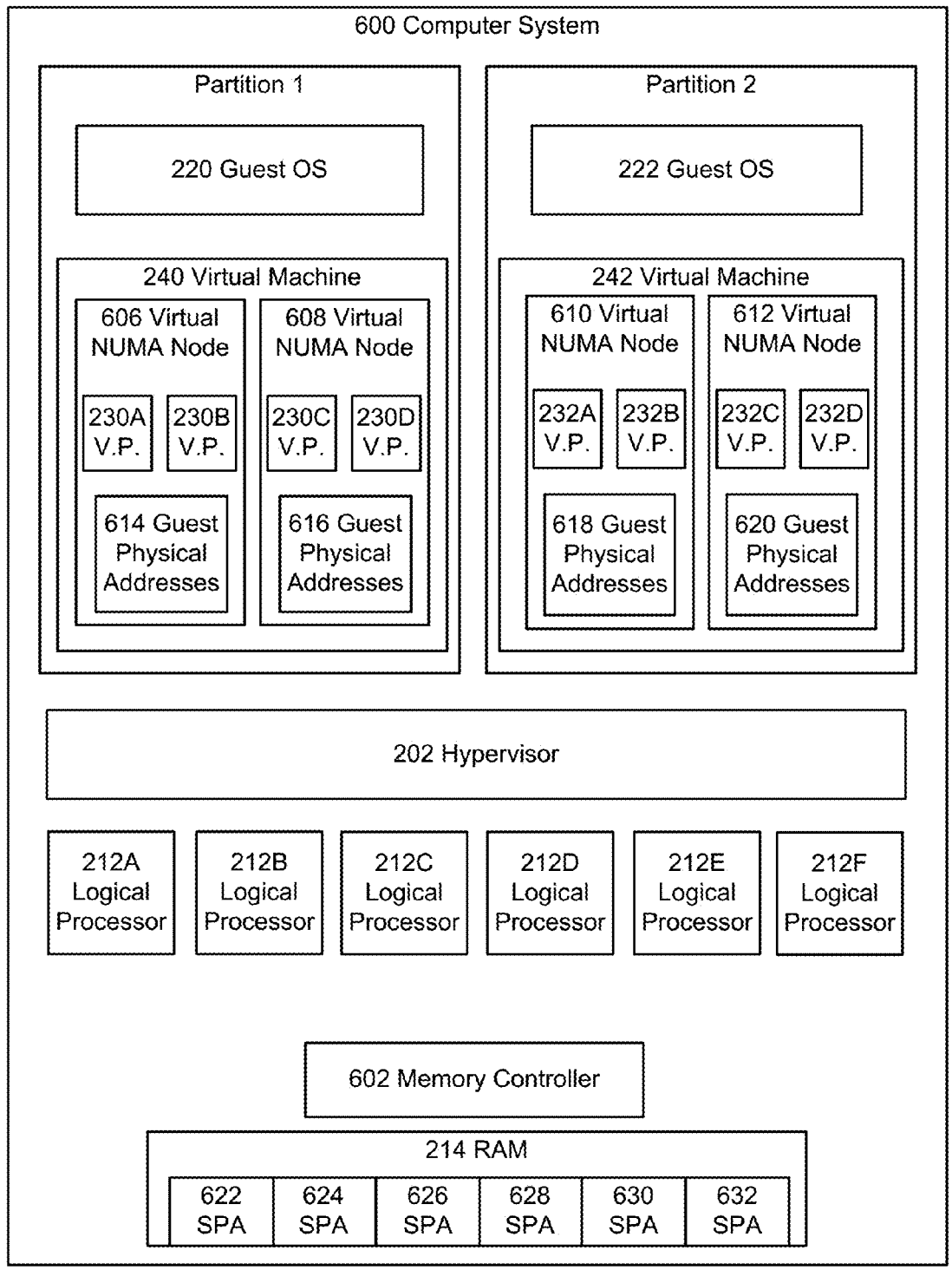
FIG. 6 depicts an example operational environment practicing aspects of the present disclosure.

Continuing with the general overview of the figures, FIG. 6 depicts a computer system 600 having a symmetric multiprocessing topology (SMP) or 'flat' topology. Generally, SMP is a computer architecture that includes a plurality of processors that are connected to a single shared memory. In this arraignment, a memory controller 602 can manage the flow of data to and from memory. Memory access may be uniform with respect to each logical processor 212A-F and each logical processor can access the entire range of memory, i.e., system physical addresses 622-632. This topology works well for computer systems that have a relatively small number of processors, but when the computer system includes many processors, all competing for access to the shared memory bus, performance of the system can decrease. Moreover, the complexity of the computer system significantly increases which in turn drives the price per processor up.

Briefly, computer system 600 can include the same, or similar components as computer 200 or 300. As shown by the figure, computer system 600 can have a plurality of logical processors 212A-212F (while six logical processors are depicted the computer system could have more or less) coupled together via a memory controller 602 that gates access to RAM 214. Similar to that described above, each logical processor 212A-212F can have different characteristics, e.g., clock speeds, cache size, etc. In this arraignment the memory controller 602 can manage the flow of data to and from the RAM 214.

Hypervisor 202 can be instantiated and it can control the hardware of the computer system 600. Hypervisor 202 can manage one or more virtual machines 240 through 242 that each can have virtual NUMA nodes such as virtual NUMA nodes 606-612. Virtual NUMA nodes 606-612 can be used to organize a virtual machine's resources by reporting virtual topologies to guest applications or guest operating systems such as guest operating systems 220 and 222. As shown by the figure, each virtual NUMA node 606-612 can have one or more virtual processors 230A-D, 232A-D and guest physical addresses 614-616, and 618-620. Generally, hypervisor 202 can back each virtual NUMA node 606-612 with one or more logical processors and system physical addresses from RAM 214. That is, hypervisor 202 can set one or more logical processors as idea processors that can be used to run virtual processors threads.

Figure 7:
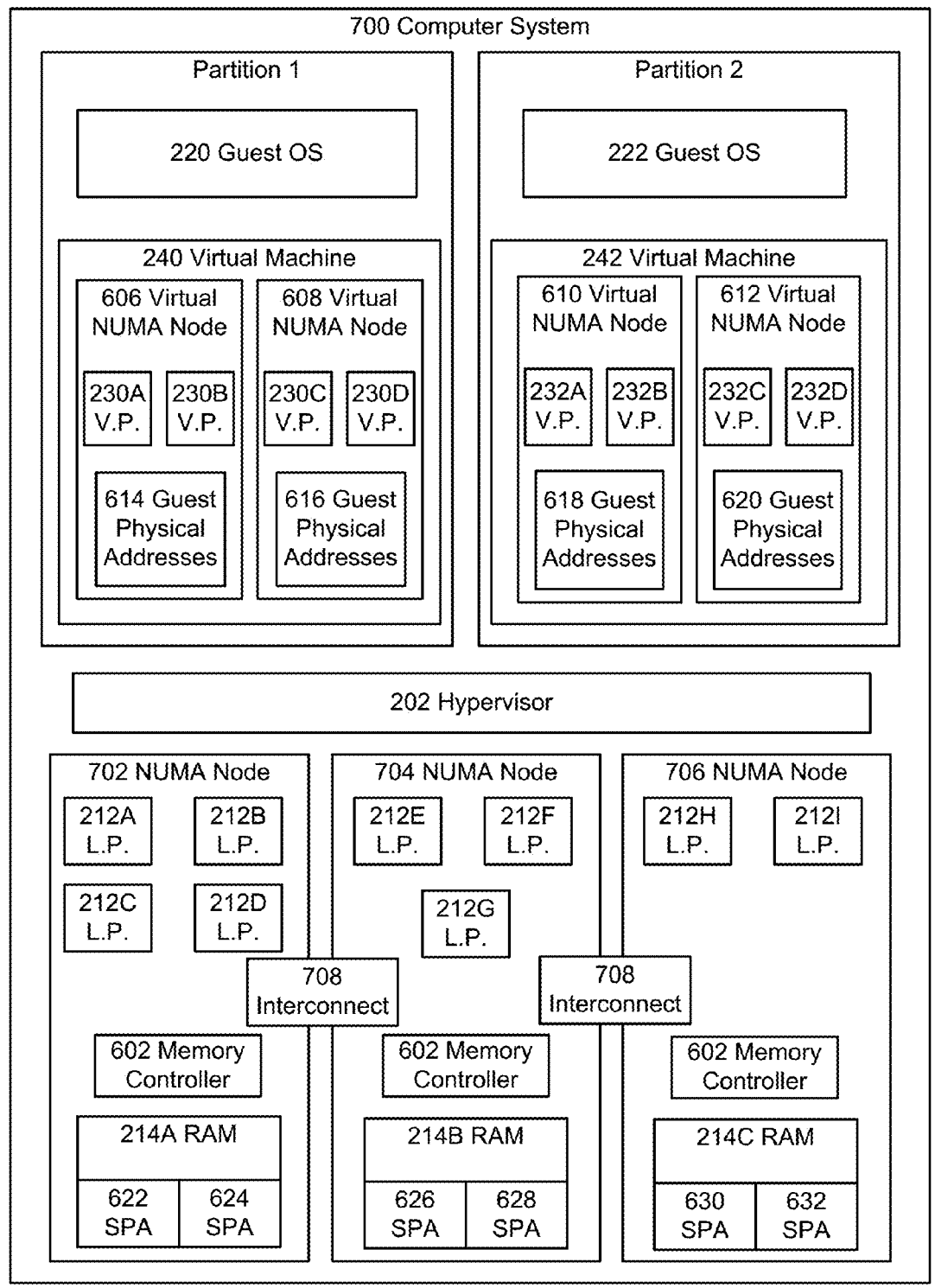
FIG. 7 depicts an example operational environment practicing aspects of the present disclosure.

Briefly, FIG. 7 depicts a computer system 700 having a topology that includes NUMA nodes 702-706. Computer systems with NUMA nodes are can be generally thought of as computers systems that are made up of smaller computer systems or cells. In this example, each NUMA node 606-612 can include one or more logical processors and local memory. The memory inside of a NUMA node is considered local memory and memory in other NUMA nodes is considered remote memory because only the processors inside of the node are connected to the same memory bus. The NUMA nodes are interconnected by cache coherency domain interconnects which allow processors in one NUMA node to access memory in other NUMA nodes in a coherent way. Thus, system physical addresses 622-632 are uniform with respect to each processor. Or put another way, system physical address 20,000 is the same for every processor in the computer system. The difference is that for some processors memory address 20,000 is a local memory address, e.g., inside their NUMA node, and for other processors memory address 20,000 is remote, e.g., outside their NUMA node. Generally, local memory can be accessed faster than remote memory and the relationship between local v. remote access time is called a NUMA ratio. A NUMA ratio of 1 to 2 means that it costs twice as many processor cycles to access a particular remote system physical address than a local system physical address. NUMA alleviates bottlenecks caused by SMP systems by limiting the number of processors on any one memory bus and is generally less expensive than a SMP computer system with the same amount of logical processors.

Computer system 700 can include the same, or similar components as computer 200 or 300. As shown by the figure, in this operational environment computer system 700 includes three NUMA nodes 702-706 (although the computer can have more or less) connected by interconnects 708. Similar to that described above, the number of processors within each NUMA node can vary, the characteristics of the processors can vary, and each node can have its own RAM.

Similar to FIG. 7, hypervisor 202 can control the hardware of the computer system 700. When guest operating systems or monolithic applications boot they can detect the topologies of the virtual machines 240 and 242 similar to that described above. Each virtual NUMA node 606-612 can be assigned one or more ideal processors and memory from one or more NUMA nodes.

While computer system 600 and 700 are depicted as including two virtual machines 240 and 242, in other embodiments they can execute more or fewer virtual machines. Moreover, while each virtual machine is depicted has having two virtual NUMA nodes, in other embodiments the virtual machines can have more or fewer virtual NUMA nodes. Also, while virtual NUMA nodes are depicted as having two virtual processors, in other embodiments the virtual NUMA nodes can have more or fewer virtual processors. Furthermore, each virtual NUMA node can have a different topology than other virtual NUMA nodes, e.g., one virtual NUMA node can have 4 virtual processors and 8 gigabytes of RAM while another virtual NUMA node can have 2 virtual processors and 4 gigabytes of RAM.

The following are a series of flowcharts depicting implementations of processes. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 8:
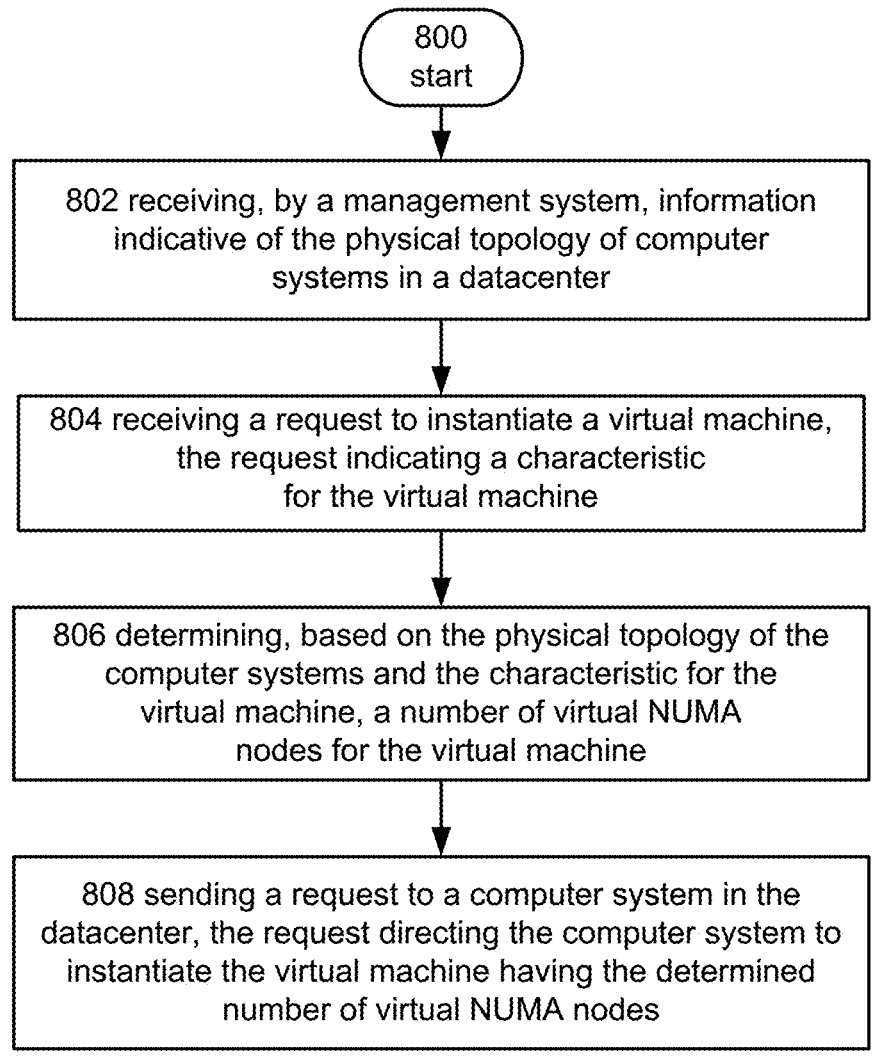
FIG. 8 depicts an operational procedure for practicing aspects of the present disclosure.

Turning now to FIG. 8, it depicts an operational procedure for practicing aspects of the present disclosure including operations 800-808. The operational procedure begins with operation 800 and operation 802 illustrates receiving, by a management system, information indicative of the physical topology of computer systems in a datacenter. For example, and referring to FIG. 5, a logical processor of management system 502 can execute one or more programs that can obtain information that identifies the physical topology of computer systems 504-510 in datacenter 500. In an embodiment, management system 502 can include a NIC and the program can use the NIC to query each computer system 504-510. In this example, each computer system 504-510 can reply with information that identifies its topology. In another embodiment, the information can be obtained from an administrator that inputs the information. In either case, the information may include, but is not limited to, information that identifies how many NUMA nodes (if any) each computer system has, how much RAM each computer system has, the speed of the RAM, how the RAM is arranged, processor speeds, how many cores each processor has, etc.

Continuing with the description of FIG. 8, operation 804 depicts receiving a request to instantiate a virtual machine, the request indicating a characteristic for the virtual machine. Management system 502 can receive a request to start virtual machine 240 from, for example, a user interface executing on management system 502 or from computer system 504-510. In this example, the request can include a desired characteristic for virtual machine 240. For example, a characteristic could be a desired amount of RAM assigned to the virtual machine, a desired number of virtual processors, or desired I/O devices.

Continuing with the description of the figure, operation 806 shows determining, based on the physical topology of the computer systems and the characteristic for the virtual machine, a number of virtual NUMA nodes for the virtual machine. Once management system 502 receives the characteristic for the virtual machine, e.g., 6 virtual processors, the management system 502 can use this information along with the information that describes the topologies of the computer systems in the datacenter 500 to determine how many virtual NUMA nodes should be created for virtual machine 240. For example, management system 502 can determine the optimum size of a virtual NUMA node for datacenter 500 and then determine how many virtual NUMA nodes are needed to build a virtual machine having the desired characteristic.

Generally, the size of the virtual NUMA node influences the operation of the virtual machine in datacenter 500. For example, as the size of a virtual NUMA node increases, e.g., in memory and/or processors, the portability of the virtual NUMA node decreases. Or put another way, large virtual NUMA nodes may make it more difficult to migrate the virtual machine. This occurs because a virtual NUMA node needs to be assigned to either a NUMA node or a computer system that has enough 'flat' resources to effectuate the virtual NUMA node. If, for example, a virtual NUMA node is too large, e.g., it has too much RAM or too many virtual processors, it won't be able to fit in smaller NUMA nodes in the datacenter 500 thus limiting the ability to migrate the virtual machine. Moreover, if the larger virtual NUMA node is simply assigned to multiple smaller NUMA nodes performance of the virtual machine will decrease because of the difference that exists between local memory and remote memory access times and also because the guest operating system may not include information that indicates the difference in local v. remote memory access times.

On the other hand, as the size of the virtual NUMA node decreases performance of the guest operating system may be adversely impacted. This inefficiency may occur because the guest operating system will try to segregate applications and it's own execution to single virtual NUMA nodes. The guest operating system will be constrained in this case and performance will decrease.

Accordingly, in an embodiment management system 502 can strike a balance between portability and efficiency by determining an optimum virtual NUMA node size for the datacenter 500. For example, in an embodiment a logical processor of management system 502 can execute a program and determine the average size of a NUMA node in the datacenter, e.g., the average number of logical processors, average amount of RAM, etc., and set the size of the virtual NUMA node to be the same or smaller than the average NUMA node in the system. In another embodiment the program can be configured to set the size of the virtual NUMA node to be slightly smaller than the smallest NUMA node in the datacenter 500. The size of the virtual NUMA node can be set to be slightly smaller than the average size or smallest size so that if the computer system becomes heavily committed, more than one virtual NUMA node can be assigned to a single NUMA node. In a specific example, if the smallest NUMA node has 4 logical processors and 8 gigabytes of RAM, then the size of the virtual NUMA node could be set to, for example, 2 virtual processors and 4 gigabytes of RAM.

Once the size of the virtual NUMA node is determined, and continuing from the example in the preceding paragraph, the size of the virtual NUMA node can be used along with the desired characteristic to generate virtual machine 240. For example, if a user indicated that they wanted a 6 processor virtual machine with 10 gigabytes of RAM, and the virtual NUMA node has 2 processors and 4 gigabytes of RAM, then management system 502 can generate a configuration file that indicates that the virtual machine will include 3 virtual NUMA nodes.

Continuing with the description of FIG. 8, operation 808 illustrates sending a request to a computer system in the datacenter, the request directing the computer system to instantiate the virtual machine having the determined number of virtual NUMA nodes. Once the configuration file is generated, management system 502 can select a computer system in datacenter 500 to instantiate virtual machine 240 and send the configuration file to the selected computer system. For example, the management system 502 can determine which computer systems can accommodate the virtual machine, e.g., which computer has the physical resources to execute the virtual machine and which computer system has the lowest workload, and send virtual machine 240 to this computer. In the same or another embodiment, a user can indicate a priority for virtual machine 240, e.g., more critical virtual machines can be tagged with information that identifies their relative importance. In this example management system 502 can be configured to send high priority virtual machines to computer systems with lower workloads and can attempt to consolidate lower priority virtual machines on a fewer computer systems. In this example a virtual machine may be "bumped" off a computer system to make room for a higher priority virtual machine.

Figure 9:
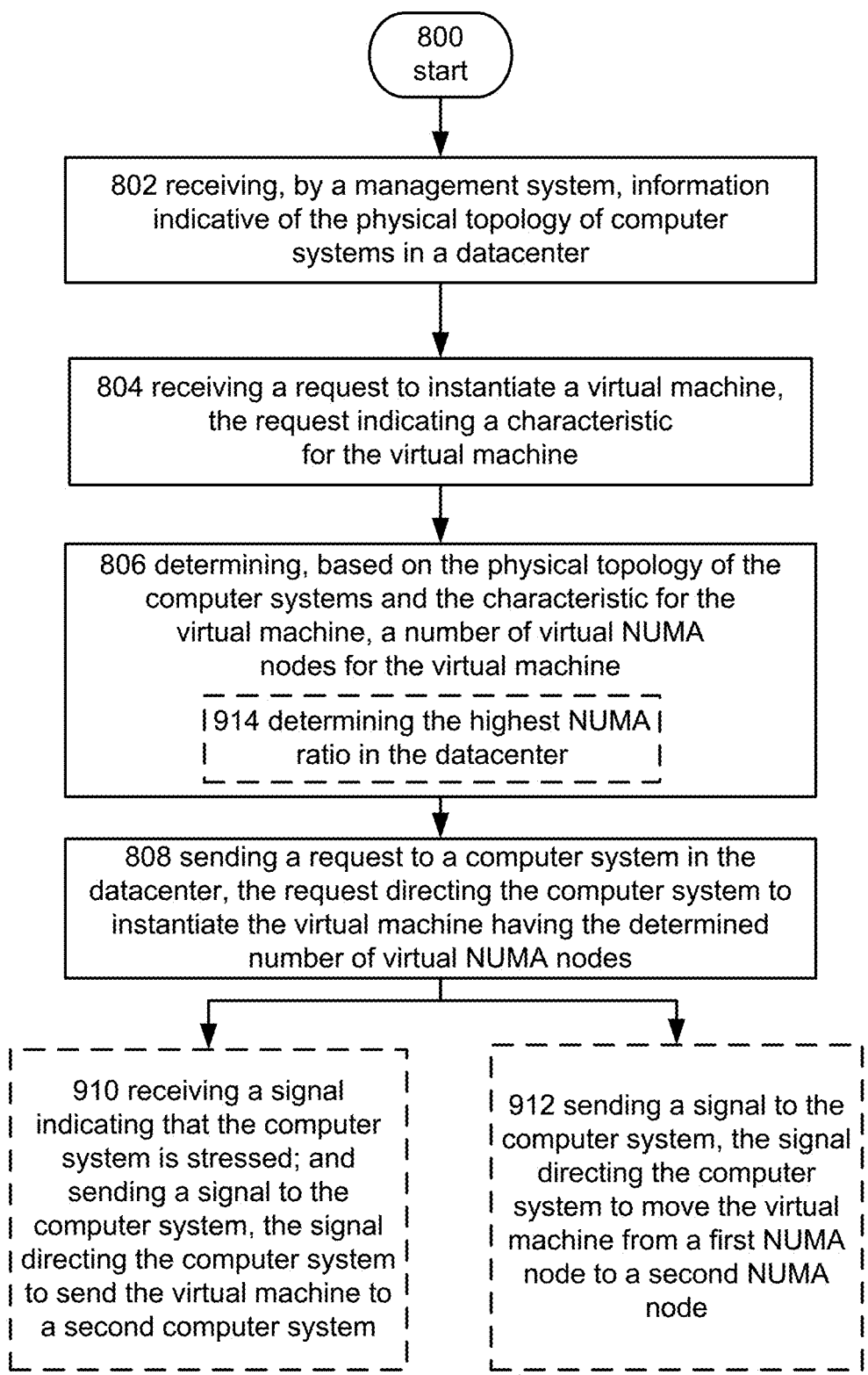
FIG. 9 depicts an alternative embodiment of the operational procedure 800 of FIG. 8.

Referring now to FIG. 9, it depicts an alternative embodiment of the operational procedure of FIG. 8 including operations 910-914. Referring to operation 910, it illustrates receiving a signal indicating that the computer system is stressed; and sending a signal to the computer system, the signal directing the computer system to send the virtual machine to a second computer system. For example, and referring to FIG. 5, management system 502 can receive a signal from a computer system such as, for example, computer system 504. The signal can indicate that the computer system's resources are stressed. In this example the amount of RAM assigned to a virtual machine may be fluid. That is, it may be adjusted during runtime. For example, the resources of computer system 504 may be overcommitted due to the fact that it is effectuating a large number of virtual machines, or virtual machines with heavy workloads. In this situation a hypervisor of computer system 504 may send a signal to the management system 502 that indicates that the computer system is low on memory, e.g., the signal may indicate that significant paging is occurring within virtual machines or that non-paged memory allocations may fail. In another example, guest operating system 220 and any workload in virtual machine 240 are taking an unacceptably long amount of time to execute. In this example, management system 502 can be configured to reduce the workload on the stressed computer system 504 by finding another computer that can accommodate virtual machine 240 and send a signal to the computer system 504 directing it to migrate virtual machine 240 to the new computer system, e.g., computer system 506. Hypervisor 202 can receive the signal and can migrate virtual machine 240 to a new computer system, e.g., to computer system 506, 508, or 510.

Continuing with the description of FIG. 9, operation 912 depicts sending a signal to the computer system, the signal directing the computer system to move the virtual machine from a first NUMA node to a second NUMA node. For example, and referring to FIG. 5, management system 502 can send a signal to computer system 504 directing it to move the virtual machine from one NUMA node to another. In this example the architecture of computer system 504 may be similar to that of computer 700 of FIG. 7. Hypervisor 202 of FIG. 7 can receive a signal that directs it to move virtual machine 240 from one NUMA node to another NUMA node, e.g., from NUMA node 704 to 702. In this example, memory pressure in guest OS 220 may be high or hypervisor threads for virtual processors 230A-D may not be scheduled fast enough on logical processors 212E and 212G. In this example, management system 502 can scan datacenter 500 and determine that virtual machine 240 should be moved to NUMA node 702 for example and hypervisor 202 can reassign virtual NUMA nodes 606 and 608 to NUMA node 702.

In an embodiment operation 806 can include operation 914 which depicts determining the highest NUMA ratio in the datacenter. For example, in this embodiment a processor of management system 502 can execute a program and determine the highest NUMA ratio that exists in datacenter 500 and use the information when determining the number of virtual NUMA nodes for virtual machine 240. For example, the NUMA ratio is a cost ratio in processor cycles between accessing remote vs. local memory. A NUMA ratio of 2 to 1 means that it takes twice as many processor cycles to access a specific remote memory address than it costs to access a local memory address. In an embodiment management system 502 can use the highest detected NUMA ratio in datacenter 500 to set the NUMA ratio reported by virtual NUMA nodes 606-608. This information can be stored in the configuration file and sent to the computer system that is going to instantiate the virtual machine. Hypervisor 202 can create a data structure in the virtual machine's firmware table that indicates the NUMA ratio for virtual NUMA nodes 606-608 and when guest operating system 220, or monolithic application boots the NUMA ratio can be used to make thread scheduling decisions.

Figure 10:
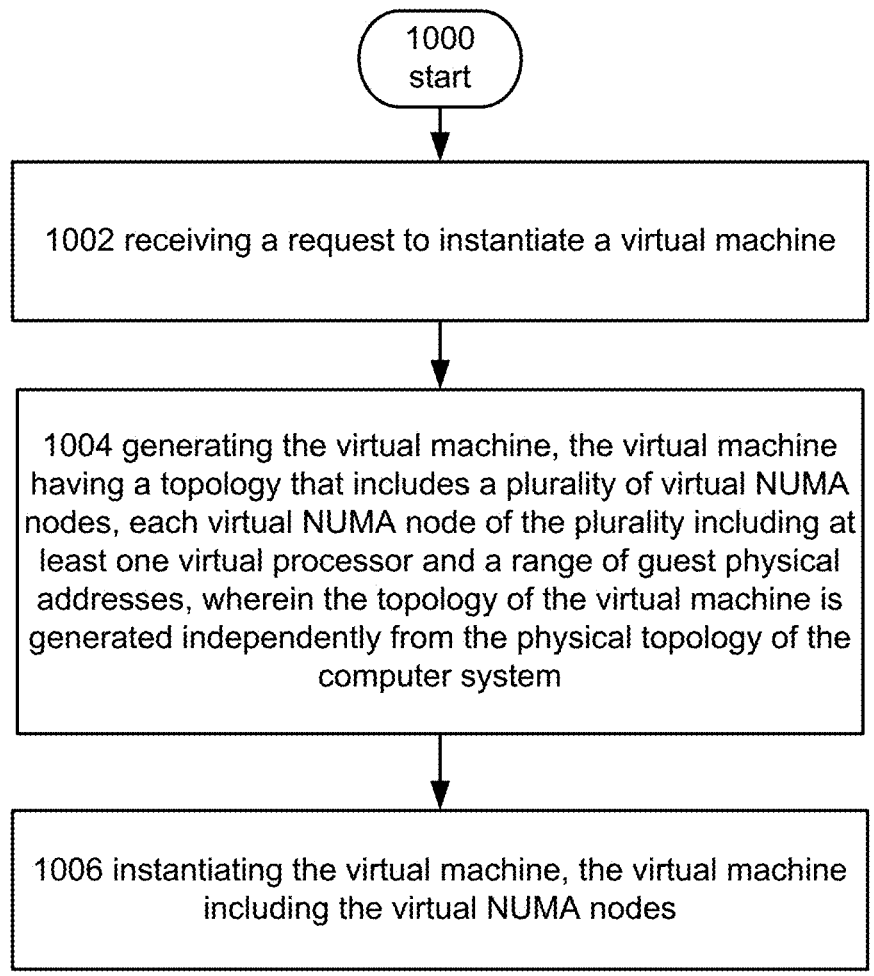
FIG. 10 depicts an operational procedure for practicing aspects of the present disclosure.

Turning now to FIG. 10, it depicts an operational procedure including operations 1000-1006. Operation 1000 begins the operational procedure and operation 1002 illustrates receiving a request to instantiate a virtual machine. For example, and referring to FIGS. 6 and 7, hypervisor 202 can receive a request to create a virtual machine such as virtual machine 240. For example, the request can be received from a management system 502, a parent partition 204 of FIG. 2 or 3, etc. The request can be for a new virtual machine or it can be a request to instantiate a previously saved virtual machine. In an embodiment of the present disclosure where the virtual machine is a new virtual machine, the characteristics of virtual machine 240 can be set by, for example, an administrator. The administrator can set how much memory the virtual machine should initially have, what type of priority the virtual machine should have relative to other virtual machines, how many virtual processors the virtual machine should have, what type of I/O devices the virtual machine should have, etc.

Turning to operation 1004, it depicts generating the virtual machine, the virtual machine having a topology that includes a plurality of virtual NUMA nodes, each virtual NUMA node of the plurality including at least one virtual processor and a range of guest physical addresses, wherein the topology of the virtual machine is generated independently from the physical topology of the computer system. For example, hypervisor 202 can construct virtual machine 240 having a plurality of virtual NUMA nodes 606-608 in response to the request. Referring to FIG. 6, virtual NUMA nodes 606-608 can each have one or more virtual processors 230A-D and guest physical addresses 614 and 616. In this embodiment virtual NUMA nodes 606 and 608 can be created independently from the topology of the underlying hardware. That is, the topology of the virtual machine is unrelated to the underlying hardware such as is depicted by FIG. 6 and FIG. 7. Thus, in this embodiment, each virtual machine's topology is decoupled from the underlying physical topology of the computer system that effectuates it.

Continuing with the description of FIG. 10, operation 1006 illustrates instantiating the virtual machine, the virtual machine including the virtual NUMA nodes. In an embodiment, hypervisor 202 can be executed by a logical processor and a virtual machine having the plurality of virtual NUMA nodes can be instantiated. For example, and referring to FIG. 6 and/or FIG. 7, a virtual machine 240 having virtual NUMA nodes 606-608 can be effectuated by computer system 600 or 700. Guest physical addresses of the virtual machine 240 can be backed with system physical addresses from RAM and virtual processors can be backed by one or more logical processors. For example, blocks of guest physical addresses 614 can be backed with blocks of system physical addresses 622 and blocks of guest physical addresses 616 can be backed by blocks of system physical addressees 624. Hypervisor threads can then be scheduled on the logical processors backing the virtual processors and instructions indicative of the virtual processors can be executed. After the virtual machine is instantiated, guest operating system 220 can schedule a process to execute on virtual processor 230A of virtual NUMA node 606. In this example, the memory manager of guest operating system 220 can select a range of guest physical addresses and allocate the range of addresses to the process. In this example guest operating system 220 can be configured to select guest physical addresses from virtual NUMA node 606. In this case the ability to migrate/restore the virtual machine is enhanced due to the fact that the virtual machine is broken up into smaller pieces and spread across the computer system.

In an embodiment the virtual machine BIOS or boot firmware can describe the virtual machine's topology, e.g., whether it has virtual NUMA nodes, the size of any virtual NUMA nodes, and NUMA ratios for the virtual NUMA nodes, to a guest operating system of monolithic application. The data structure can be processed and the guest OS or application can configure itself to take advantage of the presence of virtual NUMA nodes. For example, guest operating system 220 can try to affinitize the threads of an application that is not NUMA aware to a virtual NUMA node so that execution of the application remains local. In another example a database management program such as SQL Server can allocate locks local to the virtual NUMA nodes and the database can split up read/write requests across the virtual NUMA nodes. In yet another example the guest operating system 220 can create page pools for each virtual NUMA node in the virtual machine.

Figure 11:
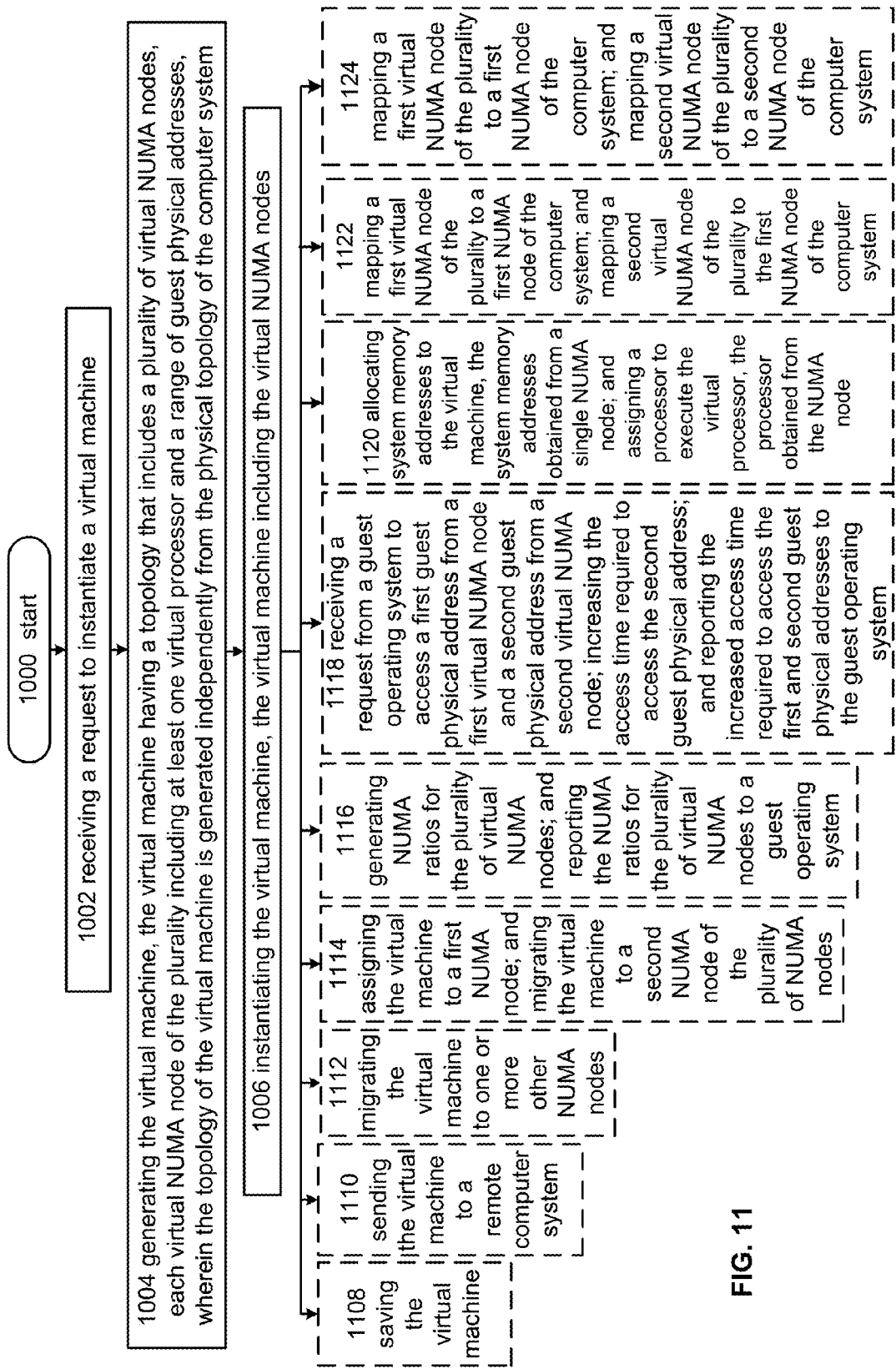
FIG. 11 depicts an alternative embodiment of the operational procedure 1000 of FIG. 10.

Referring now to FIG. 11, it illustrates an alternative embodiment of the operational procedure 1000 of FIG. 10 including operations 1108-1124. As shown by the figure, operation 1108 illustrates saving the virtual machine. For example, in an embodiment virtual machine 240 can be saved to a computer readable storage medium such as a hard drive. In an embodiment the virtual machine 240 can be saved using techniques described in U.S. patent application Ser. No. 11/487,031 entitled "Concurrent Virtual Machine Snapshots and Restore," the content of which is herein incorporated by reference in its entirety.

Continuing with the description of FIG. 11, operation 1110 shows sending the virtual machine to a remote computer system. For example, and referring to FIG. 5, in an embodiment the state of virtual machine 240 can be saved in one or more configuration files and sent to another computer system, e.g., sent from computer system 504 to 506. The hypervisor of computer system 506 can read the file or files and instantiate virtual machine 240. In a specific example, hypervisor of computer system 504 can determine to send the virtual machine 240 to computer system 506.

Virtual machine topology affects the ability to migrate and restore virtual machines. Specifically, the decision to allow the topology of the underlying hardware to be detected and the size of the virtual NUMA nodes influence how well a virtual machine will execute and whether it can be easily migrated. For example, the size of the virtual NUMA nodes affects the ability to migrate the virtual machine. That is, as the size of a virtual NUMA node increases the portability of the virtual NUMA node decrease and as the size of the virtual NUMA node decreases so does performance of the virtual machine. In addition, virtual machines that can detect the underlying computer's topology can not be easily migrated due to the fact that NUMA aware operating systems and applications optimize themselves at boot time based on first topology they detect and these optimizations may not work well on computers that the virtual machine may be migrated to in the future. Thus, by exposing virtual NUMA nodes to the guest operating system when it boots the operating system can be optimized to use NUMA nodes. By sizing the virtual NUMA nodes correctly, the virtual machine can be optimized for many diverse computer systems in datacenter 500.

For example, and referring to FIG. 6, virtual machine 240 can include two or more virtual NUMA nodes 606 and 608. Hypervisor 202 can back the virtual processors 230A-D with logical processors 212A-D. When guest operating system 220 boots it can detect virtual NUMA nodes 606 and 608 and can be configured to optimize the scheduling and execution of processes. After some time virtual machine 240 may be migrated to a computer system having a physical topology similar to that depicted by FIG. 7. Hypervisor 202 of FIG. 7 can back the virtual processors 230A and B with logical processors 212A and B and back virtual processors 230C and D with logical processors 212E and F. Guest operating system 220 can continue to operate in the same manner as it was when running on the computer system of FIG. 6 even though the underlying computer topology has changed from SMP to NUMA.

Continuing with the description of FIG. 11, operation 1112 shows migrating the virtual machine to one or more other NUMA nodes. For example, and referring to FIG. 7, hypervisor 202 can schedule virtual NUMA nodes 606-608 to run on NUMA node 702 and sometime later schedule virtual NUMA nodes 606-608 to run on, for example, NUMA node 704. In this example hypervisor 202 may migrate virtual machine 240 when NUMA node 702 is stressed. For example, guest operating system 220 and 222 may generate signals that indicate that virtual machine 240 is low on memory. In this example, hypervisor 202 can be configured to reduce the workload on NUMA node 702 by moving virtual machine 240 to a different NUMA node.

Continuing with the description of FIG. 11, operation 1114 shows assigning the virtual machine to a first NUMA node; and migrating the virtual machine to a second NUMA node of the plurality of NUMA nodes. For example, and referring to FIG. 7, in an embodiment virtual machine 240 can be assigned to first NUMA node 606 by hypervisor 202. That is, hypervisor instructions can be executed by a logical processor 212A-212I and virtual machine 240 can be assigned to, for example, NUMA node 702. In this example, virtual processors 230A-230D may be set to execute on logical processors 212A through 212D. Some time later when, for example, another virtual machine is initialized or taken offline, hypervisor 202 can be executed by a logical processor 212A-212I and the logical processor can migrate virtual machine 240 to another NUMA node in the computer system 700. More specifically, and referring to the previous example, hypervisor 202 can be executed and virtual machine 240 can be moved from NUMA node 702 to NUMA node 704. For example, virtual processor 230A and B may be assigned to logical processor 212E, virtual processor 230C and D may be assigned to logical processor 212F and guest physical addresses 614 and 616 can be backed by system physical addresses 622-624

Continuing with the description of FIG. 11, operation 1116 shows generating NUMA ratios for the plurality of virtual NUMA nodes; and reporting the NUMA ratios for the plurality of virtual NUMA nodes to a guest operating system. For example, in an embodiment hypervisor 202 can generate NUMA ratios for virtual NUMA nodes 606-608 and this information can be reported to guest operating system 220 of either FIG. 6 or FIG. 7. In an embodiment hypervisor 202 can create a data structure in a virtual machine's firmware table that indicates the NUMA ratio for the virtual NUMA nodes and when the guest operating system 220 boots the guest can read the table and use the information to make thread scheduling decisions. For example, a guest operating system, or NUMA aware application, may use the NUMA ratios to determine whether or not to use resources from a remote NUMA node. For example, an operating system may have a pending thread that is ready to be executed. The operating system in this example can also be configured to wait a certain amount of time for an ideal processor to become free otherwise it will schedule the thread on a remote processor that has less than a predetermined NUMA ratio. In this case the amount of time the scheduler is willing to wait is dependent upon the NUMA ratio.

Referring now to operation 1118, it shows receiving a request from a guest operating system to access a first guest physical address from a first virtual NUMA node and a second guest physical address from a second virtual NUMA node; increasing the access time required to access the second guest physical address; and reporting the increased access time required to access the first and second guest physical addresses to the guest operating system. Similar to operation 1116, NUMA ratios can be reported to guest operating system 220, however in this example embodiment guest operating system 220 may include instructions for determining whether the NUMA ratios are accurate. That is, guest operating system 220 may check to see if reported NUMA ratios are wrong by checking access time to various areas of memory. In this example, hypervisor 202 can be configured to monitor the boot process of virtual machine 240 and hypervisor 202 can slow down access to memory that is remote to a particular virtual NUMA node. That is, hypervisor 202 can be configured to generate larger access times for when virtual processor 230A accesses guest physical addresses 616 than when virtual processor 230A accesses guest physical addresses 614. In this example, the delay may be fictional because guest physical addresses 614 and 616 may be backed by system physical addresses from a single NUMA node such as system physical addresses 622 and 624.

In an embodiment hypervisor 202 can increase the access time by removing remote guest physical addressees 616 from the virtual processor page tables of virtual processor 230A. When virtual processor 230A attempts to access the remote memory it would fault and hypervisor instructions can be executed. Hypervisor 202 can then fix the page tables and delay the return signal from the memory address for a desired amount of time. When virtual processor 230A receives the return signal information that identifies how long it took to access the remote memory delay is introduced.

Continuing with the description of FIG. 11, operation 1120 depicts allocating system memory addresses to the virtual machine, the system memory addresses obtained from a single NUMA node; and assigning a processor to execute the virtual processor, the processor obtained from the NUMA node. For example, in an embodiment generating virtual NUMA nodes 606-608 can include allocating system physical addresses and assigning a processor from the same NUMA node 702 to back the virtual machine 240. For example, and referring to FIG. 7, the hypervisor 202 can obtain one or more blocks of system physical addresses 622-624 of NUMA node 702 and use them to back guest physical addresses 622-624. Hypervisor 202 can additionally affinitize virtual processors 230A to, for example, one or more logical processors 212A-212D of NUMA node 702.

Continuing with the description of FIG. 11, operation 1122 depicts mapping a first virtual NUMA node of the plurality to a first NUMA node of the computer system; and mapping a second virtual NUMA node of the plurality to the first NUMA node of the computer system. For example, and referring to FIG. 7, a logical processor such as logical processor 212A can execute hypervisor instructions and can affinitize virtual NUMA nodes such as virtual NUMA node 606 and 608 to a NUMA node such as NUMA node 702. More specifically, the logical processor execute instructions and can back guest physical addresses 614-616 with system physical addresses 622, guest physical addresses 618-620 with system physical addresses 624 and back virtual processors 230A through D and 232A-D with logical processors 212A through D.

Regarding operation 1124, it depicts mapping a first virtual NUMA node of the plurality to a first NUMA node of the computer system; and mapping a second virtual NUMA node of the plurality to a second NUMA node of the computer system. For example, and referring to FIG. 7, a logical processor such as logical processor 212A can execute hypervisor instructions and can assign a virtual NUMA node 606 to NUMA node 702 and assign virtual NUMA node 608 to NUMA node 704. In this example, when hypervisor 202 is executed, a hypervisor scheduler can schedule threads from virtual processors 230A-B on logical processors 212A-D and schedule threads from virtual processor 230C or D on logical processors 212E through G.

Figure 12:
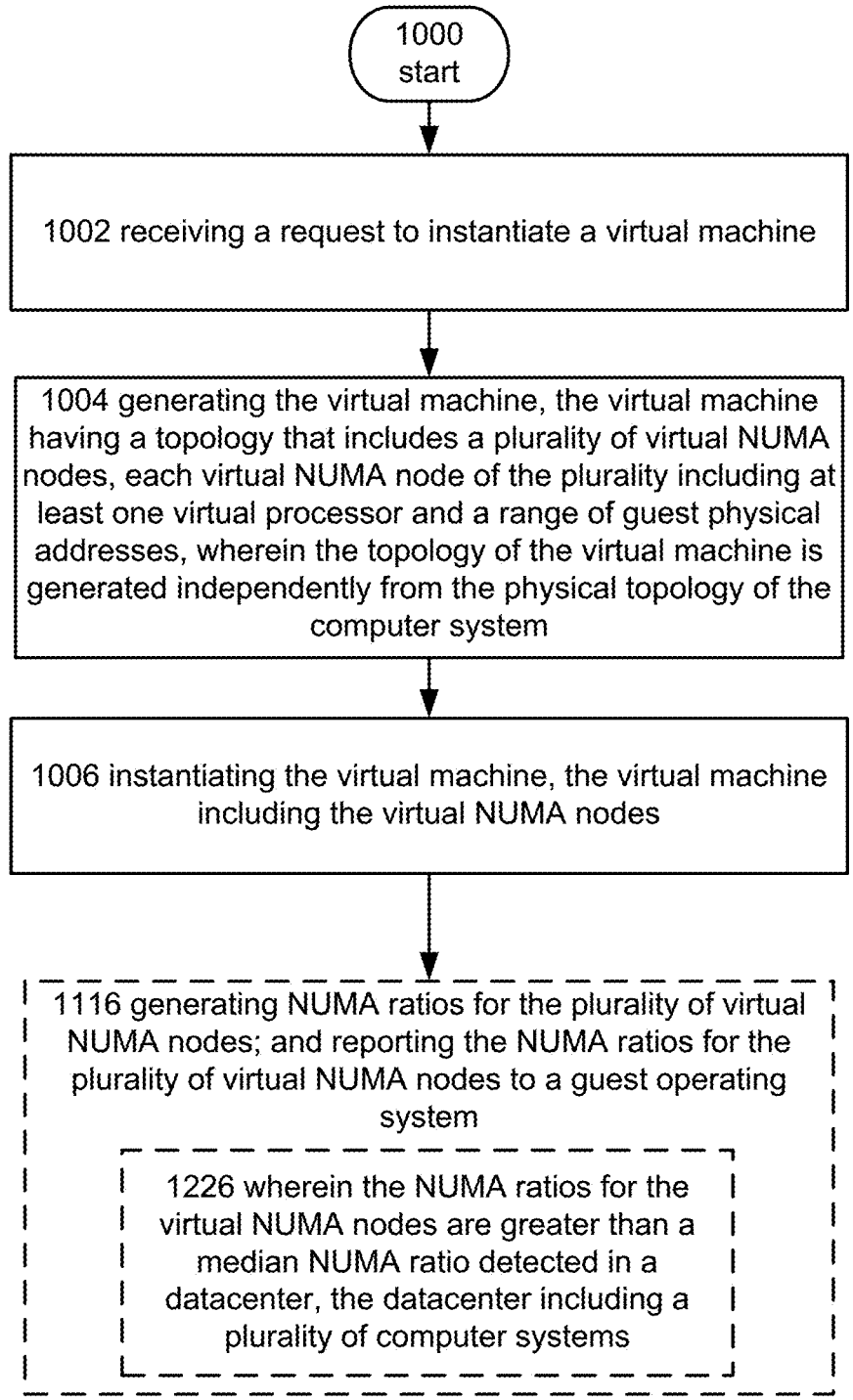
FIG. 12 depicts an alternative embodiment of the operational procedure 1000 of FIG. 11.

Turning to FIG. 12, it depicts an alternative embodiment of the operational procedure of FIG. 9. As shown by the figure, the procedure can include operation 1226 which shows that in an embodiment the NUMA ratios for the virtual NUMA nodes are greater than a median NUMA ratio detected in a datacenter, the datacenter including a plurality of computer systems. For example, and referring to FIG. 5, a management system 502 can obtain the physical topology of the computer systems 504-510 in datacenter 500. In an embodiment, the program can query each computer system 504-510 and the computers can reply with the information. Once the management system 502 has information that describes the topology of each computer system, the program can determine which computer system has a NUMA node with the highest, e.g., the worst, NUMA ratio, and/or the median NUMA ratio based. The management system 502 can use this information to generate the NUMA ratio that the virtual NUMA nodes will report to guest operating systems at boot time. In this example, the management system 502 can set the virtual NUMA ratio to be the median or greater than the highest NUMA ratio detected in the datacenter 500 thus, configuring the virtual NUMA nodes to reflect a state that is higher than half of the NUMA nodes or worse than any physical topology that any virtual machine will actually run on.

Figure 13:
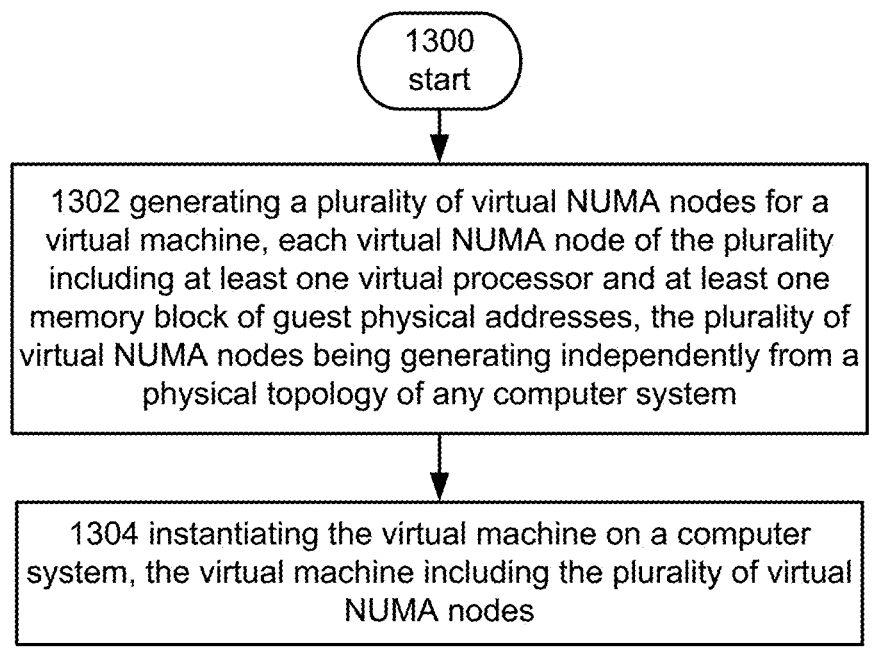
FIG. 13 depicts an operational procedure for practicing aspects of the present disclosure.

Turning now to FIG. 13, it depicts an operational procedure for practicing aspects of the present disclosure including operations 1300, 1302, and 1304. Operation 1300 begins the operational procedure and operation 1302 depicts generating a plurality of virtual NUMA nodes for a virtual machine, each virtual NUMA node of the plurality including at least one virtual processor and at least one memory block of guest physical addresses, the plurality of virtual NUMA nodes being generating independently from a physical topology of any computer system. In an embodiment a logical processor such as 212E of FIG. 6 or FIG. 7 can execute hypervisor instructions and the processor can generate virtual NUMA nodes 606-608 for virtual machine 240. Similar to that above, virtual machine 240 may have many more virtual NUMA nodes depending on, for example, the characteristics of the virtual machine, e.g., the virtual machine may have two or more virtual NUMA nodes. Hypervisor 202 can allocate the guest physical addresses to each virtual NUMA node 606 and 608. Similar to that described above, the topology of virtual machine 240 is independent from the underlying topology of the computer system. For example, the computer system that the virtual machine is eventually instantiated on can have a topology similar to computer system 600 of FIG. 6 or computer system 700 of FIG. 7.

Continuing with the description of FIG. 13, operation 1304 shows instantiating the virtual machine on a computer system, the virtual machine including the plurality of virtual NUMA nodes. Referring to FIG. 6 or FIG. 7, after hypervisor 202 has generated the virtual NUMA node configuration for virtual machine 240 it can be effectuated by a computer system. That is, hypervisor 202 schedule instructions for starting the virtual machine 240. In an example hypervisor 202 can select one or more logical processors to run instructions from virtual machine 240 and the hypervisor 202 can schedule instructions for instantiating virtual machine 240 on a logical processor. Virtual machine instructions can be executed by a processor and virtual machine 240 can be instantiated. Virtual machine 240 in this example can include boot tables that describe two or more virtual NUMA nodes. A guest operating system, or monolithic application can boot and discover the virtual NUMA nodes from the boot tables and execute instructions to configure themselves to take advantage of the topology of the virtual machine 240.

Figure 14:
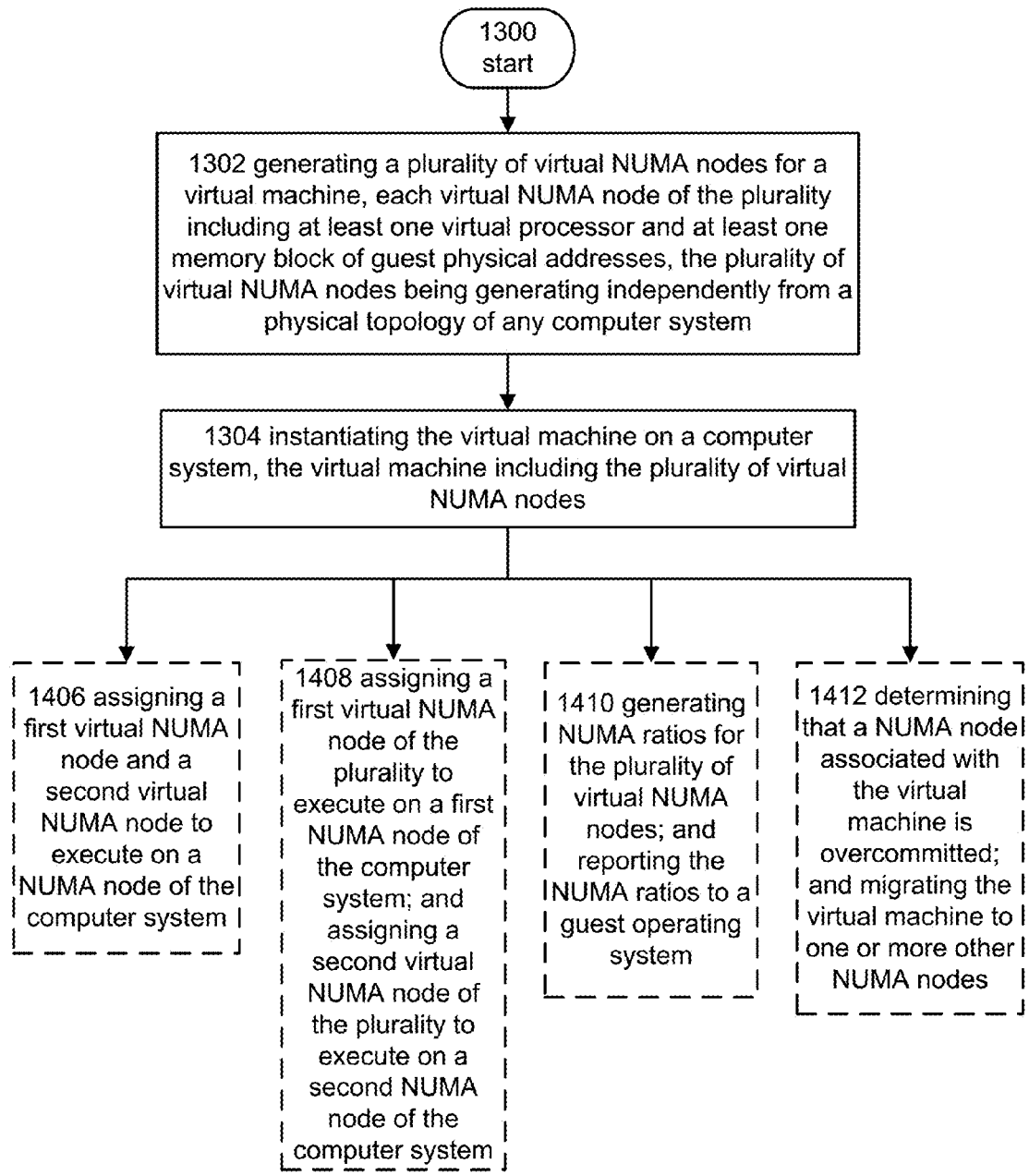
FIG. 14 depicts an alternative embodiment of the operational procedure 1300 of FIG. 13.

Referring now to FIG. 14, it depicts an alternative embodiment of the operational procedure 1300 of FIG. 13 including the additional operations 1406-1412. Referring now to operation 1406, it illustrates assigning a first virtual NUMA node and a second virtual NUMA node to execute on a NUMA node of the computer system. For example, and referring to FIG. 7, in an embodiment computer system can have an architecture that includes NUMA nodes. In this example hypervisor 202 can assign two virtual NUMA nodes of the plurality to a signal NUMA node. For example, and referring to FIG. 7, hypervisor instructions can be executed by a logical processor and virtual NUMA node 606 and 608 can be assigned to run on NUMA node 702 for example.

Continuing with the description of FIG. 14, operation 1408 depicts assigning a first virtual NUMA node of the plurality to execute on a first NUMA node of the computer system; and assigning a second virtual NUMA node of the plurality to execute on a second NUMA node of the computer system. For example, and referring to FIG. 7, a logical processor such as logical processor 212B can execute hypervisor instructions and can assign a virtual NUMA node 606 to NUMA node 704 and assign virtual NUMA node 608 to NUMA node 706. In this example, when hypervisor 202 is executed, a hypervisor scheduler can schedule threads from virtual processors 230A-B on logical processors 212F and 212G and schedule threads from virtual processor 230C or D on logical processors 212H and 212I.

Continuing with the description of FIG. 14, operation 1410 depicts generating NUMA ratios for the plurality of virtual NUMA nodes; and reporting the NUMA ratios to a guest operating system. For example, in an embodiment the hypervisor 202 can generate NUMA ratios for the virtual NUMA nodes and this information can be reported to the guest operating system 220 of either FIG. 6 or FIG. 7.

Continuing with the description of FIG. 14, operation 1412 depicts determining that a NUMA node associated with the virtual machine is overcommitted; and migrating the virtual machine to one or more other NUMA nodes. For example, and referring to FIG. 7, hypervisor 202 can schedule virtual NUMA nodes 606-612 to run on NUMA node 702. That is, NUMA node 702 may be configured to host virtual machines 240 and 242. In this example hypervisor 202 can receive a signal that indicates that NUMA node 702 is stressed. For example, guest operating system 220 and 222 may generate signals that indicate that virtual machines 240-242 are low on memory. In this example, hypervisor 202 can be configured to reduce the workload on NUMA node 702 by moving a virtual machine to a different NUMA node. In this example, hypervisor 202 can reassign the virtual NUMA nodes 606 and 608 of virtual machine 240 to execute on NUMA node 704.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method, comprising:
   receiving, by a management system, information indicative of a physical topology of computer systems in a datacenter;
   receiving a request to instantiate a virtual machine, the virtual machine comprising at least one virtual non-uniform memory architecture (NUMA) node, the request indicating a characteristic for the virtual machine;
   determining, based on the information indicative of the physical topology of the computer systems, a size for the at least one virtual node for the virtual machine, and determining, based on the determined size of the at least one virtual NUMA node for the virtual machine and the characteristic for the virtual machine, at least two virtual NUMA nodes of at least one size for the virtual machine,
   wherein the size of each virtual NUMA node for the virtual machine comprises at least two virtual processors of the virtual machine and an amount of virtual memory of the virtual machine, and wherein each virtual NUMA node for the virtual machine exists within the virtual machine; and
   selecting, based on a configuration of the virtual machine having the determined at least two virtual NUMA nodes, a computer system from the computer systems in the datacenter, and sending a request to the selected computer system in the datacenter, the request to the selected computer system directing the selected computer system to instantiate the virtual machine having the determined at least two virtual NUMA nodes.

2. The method of claim 1, further comprising:
   receiving a signal indicating that the selected computer system is stressed; and
   sending a signal to the selected computer system, the signal directing the selected computer system to send the virtual machine to a second computer system.

3. The method of claim 1, further comprising:
   sending a signal to the selected computer system, the signal directing the selected computer system to move the virtual machine from a first NUMA node to a second NUMA node.

4. The method of claim 1, wherein determining the at least two virtual NUMA nodes for the virtual machine further comprises:
   determining the highest detected NUMA ratio in the datacenter, wherein a NUMA ratio comprises a ratio of processor cycles to access a remote memory address over processor cycles to access a local memory address.

5. A computer system, comprising:
   circuitry for receiving a request to instantiate a virtual machine;
   circuitry for generating the virtual machine, the virtual machine having a topology that includes a plurality of virtual non-uniform memory architecture (NUMA) nodes, each virtual NUMA node of the plurality of virtual NUMA nodes including at least two virtual processors and a range of guest physical addresses, each virtual NUMA node existing within the virtual machine, wherein the topology of the virtual machine is generated independently from a physical topology of the computer system; and
   circuitry for instantiating the virtual machine, the virtual machine including the plurality of virtual NUMA nodes, the virtual machine being backed by physical resources of the computer system, a first virtual NUMA node of the plurality of virtual NUMA nodes being backed by a first set of physical resources from the physical resources backing the virtual machine, a second virtual NUMA node of the plurality of virtual NUMA nodes being backed by a second set of physical resources from the physical resources backing the virtual machine, the first set of physical resources and the second set of physical resources being different.

6. The computer system of claim 5, further comprising:
   circuitry for saving the virtual machine.

7. The computer system of claim 5, further comprising:
   circuitry for sending the virtual machine to a remote computer system.

8. The computer system of claim 5, further comprising:
   circuitry for migrating the virtual machine to one or more other NUMA nodes.

9. The computer system of claim 5, further comprising:
   circuitry for assigning the virtual machine to a first NUMA node; and
   circuitry for migrating the virtual machine to a second NUMA node of the plurality of virtual NUMA nodes.

10. The computer system of claim 5, further comprising:
circuitry for generating NUMA ratios for the plurality of virtual NUMA nodes; and
circuitry for reporting the NUMA ratios for the plurality of virtual NUMA nodes to a guest operating system.

11. The computer system of claim 10, wherein the NUMA ratios for the virtual NUMA nodes are greater than a median NUMA ratio detected in a datacenter, the datacenter including a plurality of computer systems.

12. The computer system of claim 5, further comprising:
circuitry for receiving a request from a guest operating system to access a first guest physical address from the first virtual NUMA node and a second guest physical address from the second virtual NUMA node;
circuitry for increasing the access time required to access the second guest physical address; and
circuitry for reporting to the guest operating system the increased access time required to access the first guest physical address and the increased access time required to access the second guest physical address.

13. The computer system of claim 5, further comprising:
circuitry for allocating system memory addresses to the virtual machine, the system memory addresses obtained from a single NUMA node; and
circuitry for assigning a physical processor to execute a virtual processor of the at least two virtual processors, the physical processor obtained from the single NUMA node.

14. The computer system of claim 5, wherein the circuitry for instantiating the virtual machine further comprises:
circuitry for mapping the first virtual NUMA node of the plurality of virtual NUMA nodes to a first NUMA node of the computer system; and
circuitry for mapping the second virtual NUMA node of the plurality of virtual NUMA nodes to the first NUMA node of the computer system.

15. The computer system of claim 5, wherein the circuitry for instantiating the virtual machine further comprises:
circuitry for mapping the first virtual NUMA node of the plurality of virtual NUMA nodes to a first NUMA node of the computer system; and
circuitry for mapping the second virtual NUMA node of the plurality of virtual NUMA nodes to a second NUMA node of the computer system.

16. A computer readable storage medium excluding signals including processor-executable instructions, the computer readable storage medium comprising:
instructions for generating a plurality of virtual non-uniform memory architecture (NUMA) nodes for a virtual machine, each virtual NUMA node of the plurality of virtual NUMA nodes including at least two virtual processors and at least one memory block of guest physical addresses, each virtual NUMA node executing within the virtual machine, the plurality of virtual NUMA nodes being generating independently from a physical topology of any computer system; and
instructions for instantiating the virtual machine on a first computer system, the virtual machine including the plurality of virtual NUMA nodes, the virtual machine being backed by physical resources of the first computer system, a first virtual NUMA node of the plurality of virtual NUMA nodes being backed by a first set of physical resources from the physical resources backing the virtual machine, a second virtual NUMA node of the plurality of virtual NUMA nodes being backed by a second set of physical resources from the physical resources backing the virtual machine, the first set of physical resources and the second set of physical resources being different.

17. The computer readable storage medium of claim 16, further comprising:
instructions for assigning the first virtual NUMA node and the second virtual NUMA node to execute on a NUMA node of the first computer system.

18. The computer readable storage medium of claim 16, further comprising:
instructions for assigning the first virtual NUMA node of the plurality of virtual NUMA nodes to execute on a first NUMA node of the first computer system; and
instructions for assigning the second virtual NUMA node of the plurality of virtual NUMA nodes to execute on a second NUMA node of the first computer system.

19. The computer readable storage medium of claim 16, further comprising:
instructions for generating NUMA ratios for the plurality of virtual NUMA nodes; and
instructions for reporting the NUMA ratios to a guest operating system.

20. The computer readable storage medium of claim 16, further comprising:
instructions for determining that a NUMA node associated with the virtual machine is overcommitted; and
instructions for migrating the virtual machine to one or more other NUMA nodes.

\* \* \* \* \*